Feb. 7, 1950 H. A. VILA 2,496,610

MODULATION SYSTEM

Filed May 19, 1948

INVENTOR.
Heriberto A. Vila

Patented Feb. 7, 1950 2,496,610

UNITED STATES PATENT OFFICE 2,496,610

MODULATION SYSTEM

Heriberto A. Vila, New York, N. Y.

Application May 19, 1948, Serial No. 27,902

11 Claims. (Cl. 332—56)

Figures 1, 2:
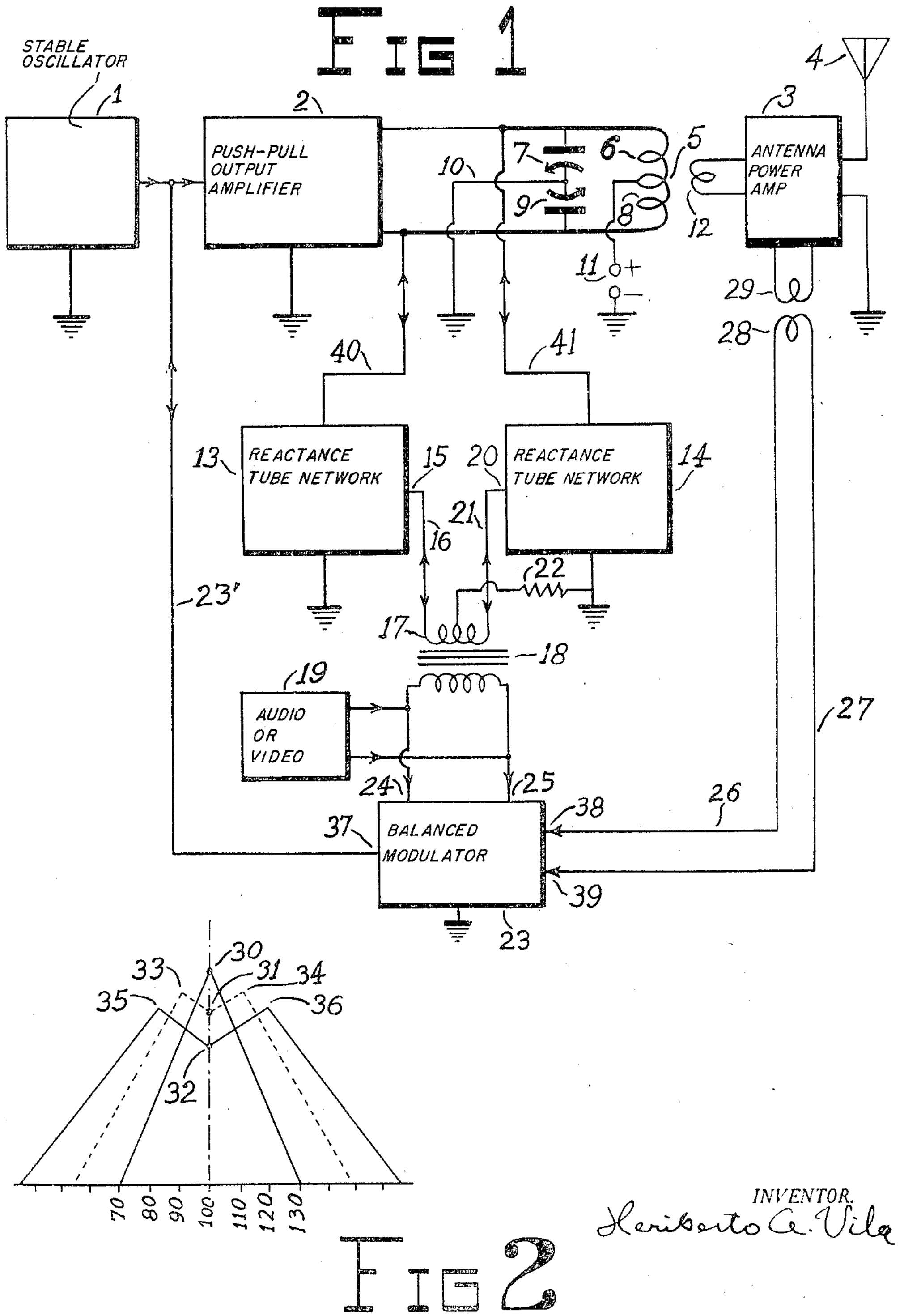

The present invention relates to signaling with high frequency carrier waves carrying either audio or video signals.

In particular it relates to a method and the means for effecting amplitude modulation of the carrier itself, and very little presence of side-bands.

In the well known method of producing amplitude modulation actually the carrier itself remains unmodulated and only the side-bands actually carry the information, as a result of a heterodyne or mixing action.

My present method permits the carrier alone to convey the modulating information by varying the level or intensity of the carrier in accordance with the frequency of said information, and without resorting to the usual heterodyne or mixing action.

Mainly, the present invention consists in translating a wave of constant amplitude and frequency through a resonant circuit, and by suitable means simultaneously detune said resonant circuit in opposite directions of its mean frequency spectrum at a rate determined by the instantaneous frequency of a modulating signal thereby varying the oscillatory conductivity or translativity of said resonant circuit. As a result of thus detuning said circuit said wave suffers two opposite phase shifts or deviations.

More complete and detailed knowledge of the present invention can be found in the following description and in the annexed drawing in which, Fig. 1 represents an arrangement constituting a transmitter from crystal oscillator to antenna and showing the means for accomplishing the method of my invention; Fig. 2 is a schematic diagram to help explain the course of operations of same invention.

Referring to Fig. 1, 1 is a source of stable high frequency oscillations such as a crystal oscillator to provide an unmodulated carrier F, 2 is an amplifier of conventional design for further selecting and increasing the strength of said carrier F, and 3 is a power amplifier whose output feeds an antenna 4. The output of the amplifier 2 preferably is of the push-pull type and terminates into a push-pull resonant circuit composed of a center tapped coil 5. One half 6 of this coil is tuned by a variable condenser 7 and the other half 8 of the same coil is tuned by a similar condenser 9. Both of said condensers have a common ground connection through a conductor 10 and are in series across the entire coil 5. The center tap of this coil is connected to a source 11 of high potential from which the plates of the tubes involved with this coil derive their power. Also energy from this coil is inductively transferred to the power amplifier 3 through a link 12.

A reactance tube network 13 of well-known design is coupled to the half-portion 8 of the coil 5. Another and similar reactance network 14 is coupled to the other half-portion 6 of the same coil 5. The reactance tube network 13 has its control input 15 connected to a lead 16 of a push-pull secondary 17 of a transformer 18 whose primary feeds from a source 19 of signaling currents. Likewise the reactance network 14 has its control input 20 connected to the opposite lead 21 of said secondary 17. The center tap of this secondary is connected to ground by the resistor 22.

Still referring to Fig. 1, 23 represents a balanced modulation of known usual design the high frequency input of which is connected through 23′ to the output of source 1, and a lower frequency input of which is connected across the output of source 19. The output circuit of this balanced modulator is connected through conductors 26 and 27 and intermediate links 28 and 29 to the power amplifier 3 at the input section of same.

Now, in order to operate the present invention for obtaining a sidebandless amplitude modulated carrier, certain conditions must be met as indicated by the curves illustrated in Fig. 2. According to this invention the stable carrier F is made to vary in strength over and below a required medium value which in Fig. 2 is exemplified by point 31; the upper value being represented by point 30 which also represents the maximum value of the carrier F; and the lower value being represented by point 32 which in turn represents a minimum value in the strength of the same carrier. For this reason and as a first requirement the resonant response of the coil 5 has to be set and kept during no modulation at the average point 31. Also that the entire antenna system beyond the coil 5 must be sharply tuned at maximum strength to the carrier F.

To help understand the present operation it should be observed that the reactance tubes 13 and 14 of Fig. 1 are provided with equal modulation grid bias voltages at their inputs 15 and 20 by sharing a common grid return resistor 22. The value of said common control voltage or bias being set at a medium value and within linearity range as it is customary to use in reactance tube practice.

Now, by way of example, assume that the frequency of the carrier F is 100 kilocycles. In order to conform the resonant response of coil 5 with the average point 31 of Fig. 2 the tuning condensers 7 and 9 are properly adjusted at the start so that the coil portion 8 is caused to shift its resonance response below 100 kilocycles to coincide with the peak 33, and so that the coil portion 6 in turn is caused to shift its resonance over 100 kilocycles to coincide with the peak 34. Observe at this time, that the average response between these two peaks 33 and 34 occurs at point 31 halfway between the required maximum strength 30 and the minimum 32.

At this time by simultaneously modulating the control inputs 15 and 20 with a push-pull signaling voltage S, shown in Fig. 1 as being translated by the transformer 18 from the source 19, the operating biases of said control inputs will be caused to change in opposite directions in both reactance tubes 13 and 14, with the result that at a certain instant the resonant strength point 31 of Fig. 2 will be lowered to 32 and at the next instant will again pass through point 31 to reach the other extreme point 30 at a rate determined by the instantaneous frequency of the signal S. Observe that at the time the resonant point 32 is reached the respective resonant peak of the portion 8 of Fig. 1 is moved to 35 in Fig. 2; and the resonant peak of portion 6 is shifted to peak 36 of Fig. 2.

It is logical to conclude that at point 30 of the combined resonant response of the coil 5 the greatest translation of oscillatory energy will be had and that at point 32 a low will be reached passing through an intermediate or zero modulation level at point 31 and the coil 5 will therefore behave as a wave conduction gate or valve.

In the present invention it is assumed that there is the possibility that side-band products of frequencies $F+S$ and $F-S$ are also produced during its operation and ultimately translated to the power amplifier 3 and subsequent antenna system. To cancel out any presence of said sidebands in said antenna system a balanced modulator 23 is used in the following manner. A sample of the carrier F supplied by the branch 23' is fed to the high frequency input 37 of said modulator which thereby will cancel or suppress this carrier; also a sample of modulating energy S is fed to the low frequency input 24 and 25 of the same modulator to heterodyne it with the carrier F. It is then well known that the output of the modulator 23 will only supply two oscillations of frequencies $F+S$ and $F-S$ which will be translated through the links 28 and 29 to the input of the amplifier 3 in such polarity phase and sufficiency that they will cancel out the oscillations of frequency $F+S$ and $F-S$ leaking into the amplifier 3 from the coil 5. And since this amplifier as a further requirement is sharply tuned to the carrier F only the amplitude modulated form of this carrier is ultimately fed to the antenna 4 with the exclusion of any nearby frequency.

I claim:

1. In combination with a source of a stable carrier oscillation, a source of signaling currents, a balanced modulator and an antenna system sharply tuned to said carrier: a resonant circuit having a center-tapped coil tuned to the frequency of said carrier oscillation, means for feeding said carrier oscillation to said resonant circuit, a tuning condenser shunted across a first half-section of said coil, another tuning condenser shunted across the other half-section of said coil, a first reactance thermionic tube coupled to the first half-section of said coil to affect the operating inductance of this first half-section, a second reactance thermionic tube coupled to said other half-section of said coil to affect the operating inductance of this other half-section, means for feeding said signaling currents to both of said reactance tubes in phase opposition to one another to combinedly affect the operating inductance of said coil at a rate determined by the frequency of said signaling currents, means for feeding said stable carrier oscillation and said signaling currents to said balanced modulator to effect a suppression of said carrier and the generation of corresponding sideband frequencies, means for translating oscillatory energy from said resonant circuit to said antenna system, and means for sufficiently feeding to said antenna system said sideband frequencies in such phases as to cancel out similar sideband frequencies pertaining to said oscillatory energy with the exception of the frequency of said carrier.

2. In a signaling apparatus for radiating a sidebandless amplitude modulated carrier wave comprising a source of a stable carrier oscillation, a source of signaling currents, a balanced modulator and an antenna system sharply tuned to the frequency of said oscillation: a resonant circuit having a center-tapped coil and tuned to said frequency, means for feeding said oscillation to said resonant circuit, a tuning condenser shunted across a first half-section of said coil, another tuning condenser shunted across the other half-section of said coil, a first reactance thermionic tube shunted across said first half-section, a second reactance thermionic tube shunted across the said other half-section, means for feeding said signaling currents to both of said reactance tubes in phase opposition to one another thereby affecting the operating inductive reactance of said coil at a rate determined by the frequency of said signaling currents, means for feeding said stable carrier oscillation and said signaling currents to said balanced modulator to effect a suppression of said carrier and the generation of corresponding sideband frequencies, and means for sufficiently feeding to said antenna system said sideband frequencies in such phases as to cancel out similar sideband frequencies pertaining to said oscillatory energy with the exception of the frequency of said carrier.

3. In a system for radiating a sidebandless amplitude modulated carrier wave, the combination with a source of a stable carrier oscillation, a source of signaling currents, a balanced modulator and an antenna system sharply tuned to the frequency of said oscillation, of a resonant circuit having a center-tapped coil and tuned to said frequency, of means for feeding said oscillation to said resonant circuit, of a tuning condenser shunted across a first half-section of said coil, of another tuning condenser shunted across the other half-section of said coil, of a first reactance thermionic tube shunted across said first half-section, of a second reactance thermionic tube shunted across said other half section, of means for feeding said signaling currents to both of said reactance tubes in phase opposition to one another thereby affecting the operating inductive reactance of said coil at a rate determined by the frequency of said signaling currents, of means for feeding said stable carrier oscillations and said signaling currents to said balanced modulator to effect a suppression of said carrier and the generation of corresponding sideband frequencies, and of means for sufficiently feeding to said antenna system said sideband frequencies in such a phase as to cancel out similar sideband frequencies pertaining to said oscillatory energy with the exception of the frequency of said carrier.

4. In combination with a source of a stable carrier oscillation, a source of signaling currents, a balanced modulator and an antenna system sharply tuned to said carrier: a resonant circuit having a center-tapped coil tuned to the frequency of said carrier, means for feeding said carrier oscillation to said resonant circuit, a first reactance thermionic tube coupled to a first half-section of said center-tapped coil, a second reactance thermionic tube coupled to the other half-section of said center-tapped coil, means for feeding said signaling currents to both of said reactance tubes in phase opposition to one another to combinedly affect the operating inductance of said coil at a rate determined by the frequency of said signaling currents, means for feeding said stable carrier oscillation and said signaling currents to said balanced modulator to effect a suppression of said carrier and the generation of corresponding sideband frequencies means for translating oscillatory energy from said resonant circuit to said antenna system, and means for sufficiently feeding to said antenna system said sideband frequencies in such a phase as to cancel out similar sideband frequencies pertaining to said oscillatory energy with the exception of the frequency of said carrier.

5. In combination with a stable carrier oscillation source, a source of signalling currents, a balanced modulator and an antenna system sharply tuned to said carrier: a resonant circuit tuned to a frequency slightly different from that of said carrier, means for feeding said carrier oscillation to said resonant circuit, a reactance tube shunted across a portion of said resonant circuit, means for feeding said signalling currents to said reactance tube to linearly affect the operating inductive reactance of said resonant circuit at a rate determined by the frequency of said signalling currents, means for feeding said carrier oscillation and said signalling currents to said balanced modulator to thereby cause a suppression of said carrier and the generation of corresponding sideband frequencies, means for transferring oscillatory energy from said resonant circuit to said antenna system, and means for sufficiently feeding to said antenna system said sideband frequencies in such phases as to cancel out similar sideband frequencies pertaining to said oscillatory energy with the exception of the frequency of said carrier.

6. The combination as recited in claim 5 wherein said resonant circuit is tuned to a frequency suitably higher than that of said carrier.

7. The combination as recited in claim 5 wherein said resonant circuit is tuned to a frequency suitably lower than that of said carrier.

8. In a signalling apparatus for radiating an amplitude modulated carrier wave comprising a source of a stable high frequency oscillation, a source of modulating currents, a first resonant circuit tuned to a frequency suitably higher than that of said oscillation, a second resonant circuit tuned to a frequency suitably lower than that of said oscillation, a first reactance tube shunted across said first resonant circuit, a second reactance tube shunted across said second resonant circuit, a balanced modulator and an antenna system, the method which includes feeding said high frequency oscillation simultaneously to said first and second resonant circuits, simultaneously feeding said modulating currents in positive phase to the first of said tubes and in negative phase to the second of said tubes, combining said high frequency oscillation and said modulating currents in said balanced modulator, transferring oscillatory energy from said resonant circuits to said antenna system, and feeding carrier-less sideband frequency products from said balanced modulator into said antenna system in such a phase and magnitude to sufficiently cancel out similar sideband products introduced into said antenna system during said energy transferring step.

9. An electrical network for varying the amplitude of a constant frequency wave at a lower frequency rate, comprising a first resonant circuit tuned to a frequency suitably higher than that of said wave, a second resonant circuit tuned to a frequency suitably lower than that of said wave, means for equally feeding said wave to both of said circuits, a reactance tube coupled to said first circuit, a similar reactance tube coupled to said second circuit, means for varying the respective operatnig biases of said tubes in phase opposition at said lower frequency rate, and means to absorb the combined oscillatory energy output from both of said circuits.

10. In a signalling apparatus for radiating an amplitude modulated carrier wave comprising a source of a stable high frequency oscillation, a source of modulating currents, a resonant circuit tuned to a frequency suitably higher than that of said oscillation, a reactance tube shunted across said resonant circuit, a balanced modulator, and an antenna system tuned to said oscillation, the method which includes feeding said high frequency oscillation to said resonant circuit, feeding said modulating currents to said reactance tube, combining said high frequency oscillation and said modulating currents in said modulator, transferring energy from said resonant circuit to said antenna system, and feeding carrier-less sideband frequency products from said balanced modulator into said antenna system in such a phase and magnitude for sufficiently cancelling out similar sideband products introduced into said antenna system during said energy transferring step.

11. The apparatus as recited in claim 10 wherein said resonant circuit is tuned to a frequency suitably lower than that of said oscillation.

HERIBERTO A. VILA.

REFERENCES CITED

The following references are of record in the file of this patent:

UNITED STATES PATENTS

| Number | Name | Date |
|---|---|---|
| 1,558,909 | Nichols | Oct. 27, 1925 |
| 2,015,175 | Ditcham | Sept. 24, 1935 |
| 2,183,795 | Peterson | Dec. 19, 1939 |